May 22, 1945. G. HEIM 2,376,692
DEVICE FOR CONNECTING SHEET METAL MEMBERS
Filed July 6, 1937
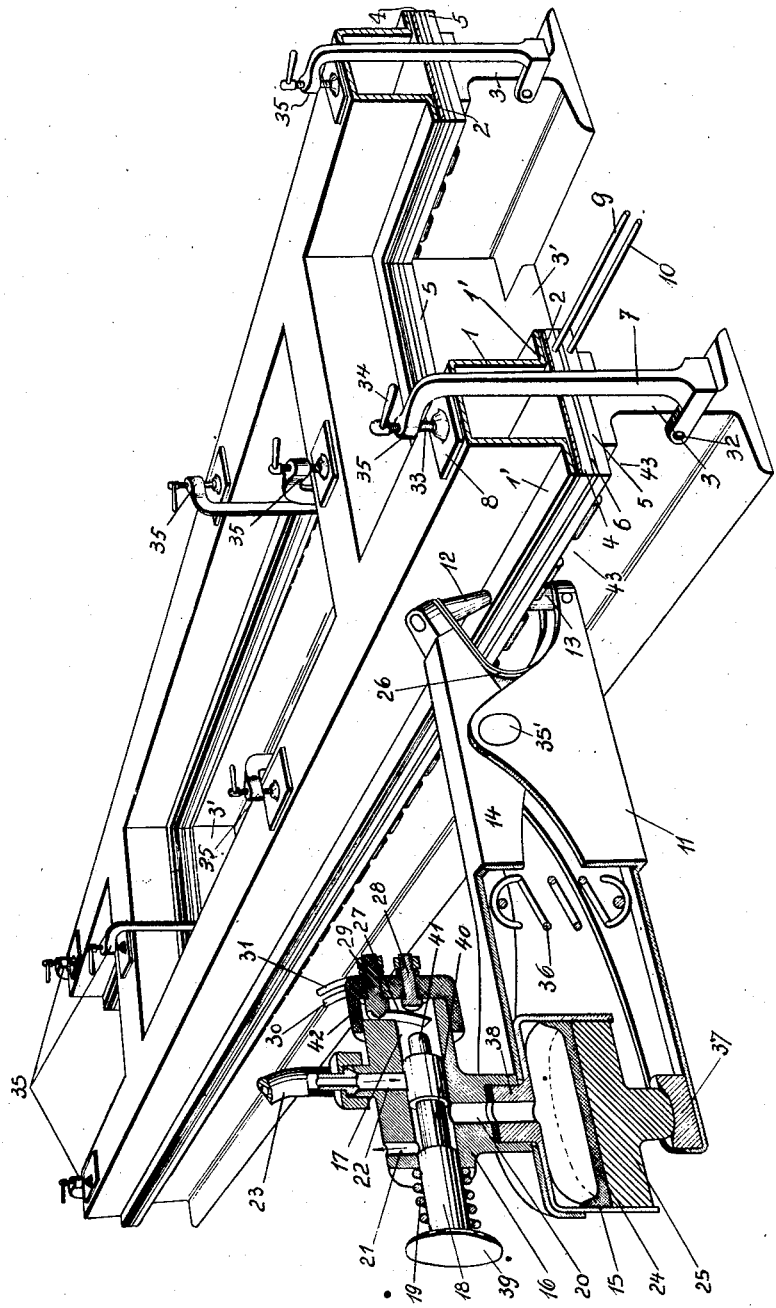
Inventor
Gerhard Heim Patented May 22, 1945

2,376,692

UNITED STATES PATENT OFFICE 2,376,692

DEVICE FOR CONNECTING SHEET METAL MEMBERS

Gerhard Heim, Sindelfingen, Germany; vested in the Alien Property Custodian

Application July 6, 1937, Serial No. 152,008
In Germany July 6, 1936

1 Claim. (Cl. 219—4)

My invention relates to a device for connecting sheet metal members by a spot welding operation and, more particularly, to a device of this type in which the sheet metal members are firmly clamped in position on a set of electrode bars connected to one terminal of a transformer, the other terminal being connected to a second set of electrode bars which are mounted in opposed relationship to the first-mentioned set and cooperate with a movable welding implement brought to engagement with the work piece and adapted to conduct the current therethrough.

In devices of this kind which were known prior to my invention, the two sets of electrode bars of different polarity are mounted in spaced relationship parallel to each other. The movable welding implement is brought to engagement with the work piece at the spots to be welded and is then spread apart until it engages the opposed electrode bar. In this manner, the required welding pressure is produced and the circuit is closed. In order to avoid deformation of the electrode bars under the effect of the welding pressure exerted by the welding implement, each electrode bar is mounted on a heavy steel beam capable of withstanding such pressure and all of the steel beams are interconnected to form a unitary rigid welding frame.

This prior device is objectionable for several reasons. The electrode bars to be engaged by the welding implement interfere in many cases with the insertion and the removal of the work piece and, therefore, must be so mounted on the welding frame as to be capable of ready removal or disassembly. As bending stresses are set up in the beams by the pressure exerted by the welding implement, the beams must be made comparatively heavy and, therefore, constitute a large bulk of magnetic material which causes considerable hysteresis losses since alternating current is ordinarily employed for the welding operation.

The object of my invention is to avoid these disadvantages by an improved arrangement of the electrode bars and of the welding implement to be used in connection therewith. Further objects are to reduce the number and the dimension of the beams constituting the welding frame and to provide an improved welding device in which the electrode bars will not interfere with the insertion and the removal of the work pieces.

I achieve these and other objects of my invention by superimposing the two electrode bars of opposite polarity, a suitable insulator only being interposed therebetween, and by placing them on a simple carrier, for instance on a beam of the welding frame in such a manner that the one electrode bar contacting with the work piece is positioned between the latter piece and the other electrode bar engaged by the welding implement. With this arrangement, the pressure exerted by the welding implement does not set up any stress in the carrier supporting the two electrode bars and the work piece. Hence, the carrier may be made much lighter than it was possible prior to my invention and will cause negligible hysteresis losses only. Also, the carrier will not interfere with the mounting of the work pieces.

Further objects of my invention are to provide an improved welding implement of simple and inexpensive design and simplified manipulation.

Still further objects of my invention will appear from the description of a preferred embodiment following hereinafter and the features of novelty will be pointed out in the claims.

In the drawing, I have illustrated a welding frame designed for connecting the sheet metal components of an automobile frame by a spot welding operation and my improved welding implement in a perspective view, partly shown in section.

The welding frame comprises two longitudinal beams 3 of I-cross-section interconnected by a plurality of transverse beams indicated at 3'. This frame conforms generally with the shape of the automobile frame composed of a plurality of U-profiled sheet metal members 1 and of substantially plane sheet metal members 2. The webs of the members 1 have flanges 1' which intimately contact with the marginal portions of the members 2 and are to be connected therewith by a spot welding operation.

Each element 3, 3' of the frame constitutes a carrier for two superimposed electrode bars 4 and 5 which may be in form of comparatively thin copper plates placed on the bars and which are insulated from each other, for instance by interposition of a comparatively thin layer 6 of any suitable insulating material. Suitable connecting means, such as insulated bolts or rivets (not shown), are provided to hold the electrode bars 4 and 5 firmly in position on the frame 3, 3'. The frame and the electrode bars are so shaped that they are in intimate contact with each other and with the work piece 1, 2 at any welding spot. After the sheet metal work pieces 1 and 2 have been placed in proper position on the electrode bars 4, they are rigidly clamped thereto by suitable means, for instance by clamps each comprising a yoke 7 pivotally connected to the frame at 32, a clamping screw 33 mounted in the free end of the yoke and provided with a handle 34, and a shoe 8 of insulating material inserted between the screw 33 and the work piece 1. While I have shown one such clamp only in detail in the drawing, it is to be understood that a plurality of such clamps is provided for instance at all of the points indicated at 35. The two electrode bars 4 and 5 are connected with the output terminals of a transformer (not shown) by suitable conductors 9 and 10.

It is to be understood, of course, that the various electrode bars 5 which are directly placed on the frame 3, 3' are either integral with each other or suitably interconnected by electric conductors. Similarly, the electrode bars 4 are electrically connected, preferably integrally, with each other.

The welding implement is adapted to embrace the sheet metal members 1' and 2 and the two electrode bars 4 and 5 and to contact the lower bar 5 and the upper sheet metal member 1' at opposite points to conduct current from one bar to the other through the sheet metal members, whereby the same are heated to welding temperature. For this purpose, any suitable welding implement may be used. However, I have invented an improved device for this purpose which comprises two pivotally connected supports 11 and 14, opposed contact members 12 and 13 mounted thereon, a flexible electric conductor 26 connecting these contact members and means for imparting a pivotal relative movement to the supports 11 and 14. In operation, the contact member 12 is placed on the flange 1' of the work piece and the contact member 13 is placed on the electrode bar 5 from below, whereupon the two contact members are pressed towards each other to produce the required welding pressure. The means for imparting the relative movement may be a simple handle or may be a power-driven mechanism. I prefer, however, to employ pneumatic means and a manually operable valve for controlling it.

In the embodiment shown in the drawing, the two supports 11 and 14 are hollow sheet metal members of U-shaped cross-section having overlapping flanges traversed by a pivot pin 35'. The contact members 12 and 13 mounted on the ends of the short arms of the members 11 and 14 are interconnected by a flexible conductor 26, whereas the long arms are connected by a helical spring 36 tending to spread the contact members 12 and 13 apart.

A cylinder 15 is inserted in and suitably attached to the upper member 14 and accommodates a piston 25 which projects from the open lower end of the cylinder 15 and engages a cushion 37 carried by the lower member 11. The cylinder 15 is integral with a threaded bushing 38 which projects upwardly through a hole provided in the member 14 and carries a valve chamber 16 provided with a horizontal bore 17 and with a number of transverse bores 20, 21 and 22. A cylindrical valve member 18 guided in the bore 17 is provided with a knob 39, with a recessed central portion 40 and with an end stud 41 of insulating material. The bore 17 is closed by a cap 42 of insulating material in which two terminals 28 and 29 are mounted. These two terminals are connected by two electric conductors 30 and 31 with a relay or similar mechanism (not shown) controlling the supply of electric current to the conductors 9 and 10.

A flexible bridge member 27 is connected to the terminal 29 and adapted to be engaged by the stud 41 to be pressed against the terminal 28 to close a circuit through the relay or the like, whereby current is supplied to the electrode bars 4, 5. A helical spring 19 surrounds the valve member 18 and tends to move it towards the left. The bore 22 is suitably connected with a pipe 23 leading to a source of compressed air.

After the operator has brought the welding implement to proper position, he depresses the knob 39, whereby the valve member 18 is pushed towards the right to a position in which the space surrounding the recessed portion 40 establishes a communication between the bore 22 and the bore 20. At the same time, the switch constituted by the elements 27, 28 and 29 is closed. The compressed air supplied through the pipe 23 flows into the cylinder 15 and depresses the piston 25, whereby a pivotal movement is imparted to the members 11 and 14 so as to firmly press the contact members 12 and 13 towards each other. The electric current supplied to the conductors 9 and 10 as a result of the closure of the switch 27, 28 and 29 will then flow through the bar 4, the work piece 1', the contact member 12 contacting therewith, the flexible conductor 26, the contact member 13, the lower bar 5 and the conductor 10. Consequently, the sheet metal members 1' and 2 will be highly heated at the spot of engagement with the contact member 12 and will be firmly welded together under the pressure exerted by the contact members.

When the welding operation is finished, the operator releases the knob 39, whereupon the spring 19 restores the valve member 18 to the initial position shown in which the cylinder 15 is connected with the exhaust conduit 21 thus permitting the spring 36 to spread the contact members 12, 13 apart. Then the operator applies the implement to the next spot to be welded.

The superimposed bars 4 and 5 project beyond the beam 3 or 3' at the welding spots to present an unobstructed face to the contact member 13 for engagement therewith. Preferably, the beam 3, 3' is recessed for this purpose, as shown at 43.

As the two electrode bars of different polarity are supported by the same beam and as this beam is not subjected to any stress produced by the welding pressure, it is obvious that the beams of the welding frame may be made much thinner than it was possible prior to my invention. Owing to the reduction of the mass of steel, the hysteresis losses are minimized. The work pieces may be put in position without requiring disassembly of the electrode bars.

My invention is not limited to the exact details of the construction shown but includes such variations and modifications as come within the scope of the appended claim.

What I claim is:

A welding implement comprising two substantially straight sheet metal members, each having a flange extending along the sides and around one end of the member, means engaging said flanges for pivotally connecting said members near one end and thereby forming long and short arms, two opposing work engaging contacts carried respectively by said short arms, a spring connected to the long arms inside the flanges and tending to separate the contacts and means for moving said contacts toward one another consisting of a cylinder mounted at said end of one arm inside its respective flange, a piston in said cylinder, and formed with a central outer projection, a cushion against which said projection abuts, mounted at said end of the other arm inside its respective flange and means for supplying fluid under pressure to said cylinder.

GERHARD HEIM.